United States Patent Office 2,983,584
Patented May 9, 1961

2,983,584

PRODUCTION OF HYDROGEN PEROXIDE

André Sancelme, Paris, France, assignor, by direct and mesne assignments, to Societe d'Electrochimie d'Electrometallurgie et des Acieries Electriques d'Ugine and l'Air Liquide, Societe Anonyme pour l'Etude et l'Exploitation des Procedes Georges Claude No Drawing. Filed Nov. 22, 1955, Ser. No. 548,538

Claims priority, application France Dec. 1, 1954

9 Claims. (Cl. 23—207)

The present invention concerns a process for the preparation of hydrogen peroxide, in which alternate reactions are used of reduction and oxidation of organic compounds, in particular alkylanthraquinones. These latter compounds are, in general, dissolved in a solvent, and hydrogenated to a condition of anthraquinhydrones or anthrahydroquinones, using as a catalyst a metal in a divided or supported condition, for instance nickel or palladium.

The process which is an object of the present invention uses a catalyst the metal of which is distributed in the mass of an inert support. The use of a supported metal rather than a divided metal is justified when the duration of the metal activity is sufficiently long, or when its regeneration does not call for excessive expenditures, the amount of material (metal and support) involved being far larger than the equivalent amount of divided metal.

The qualities required from such a catalyst, in addition to selectivity are:

(a) An activity constant in time, kept as long as possible.

(b) A sufficient mechanical strength so that it cannot be crushed or fritter away.

(c) A large effective contact surface with the fluids present.

(d) A resistance to poisoning by the reaction materials or impurities.

(e) Weight of metal involved as low as possible for a given activity.

The catalytic reaction taking place in a liquid medium it is advantageous that the absorption of the liquid by the catalyst be low. An important absorption immobilizes a large amount of the reacting liquid, decreases the effective contact surface and makes the later recuperation of the catalyst very costly, if not impracticable, by increasing the losses of materials, of washing solution for the desorption and of time. Thus in case of a reaction in a liquid medium, an extreme porosity of the inert medium may offer more drawbacks than advantages.

The process according to the present invention is characterized in that the inert support is constituted by a cement provided with cells, of the so-called "porous cement" type.

As the catalyst will have to undergo thermal treatments during its activation and its possible regeneration, a refractory cement will be used, preferably, for instance an aluminous cement of high purity.

All methods suitable for causing the formation of cells in a cement may, a priori, be used, particularly the formation of an emulsion of air bubbles by a vigorous kneading of the paste and the addition of substances capable of being decomposed while evolving gas bubbles before the complete setting of the cement.

Among these substances, carbonates or bicarbonates, hydrazine and various peroxides, particularly hydrogen peroxide may be mentioned as examples.

The latter substance, in particular, gives very good results: it makes it possible to give the desired porosity to the cement, when cold, without introducing substances detrimental to the catalyst or to the strength of the cement.

The cement, intimately mixed and crushed, if necessary, with the compound of the active metal, is mixed with the amount of water necessary for obtaining a smooth and consistent paste. A tensio-active element is then added for holding the gas bubbles released during the hardening of the cement.

It is preferable to avoid synthetic agents containing sulphur in their molecules. Excellent results are obtained with a 5% solution of very pure soap in an amount equal to about 2 to 5% of the amount of water used for the mixing.

Then amounts of hydrogen peroxide are added according to the desired porosity (of the order of 1% of the amount of mixing water expressed in amounts of commercial hydrogen peroxide at 35% in weight).

The mixture is then rapidly stirred and poured into moulds. It is left standing as long as possible and it swells under the action of the bubbles of oxygen caused by the decomposition of the hydrogen peroxide in contact with a decomposition catalyst which may be the metal compound itself.

This decomposition is completed, in general, after 45 minutes and often after 15 to 20 minutes, and, in consequence, one will have to operate rapidly so as not to destroy the bubbles and damage the uniform porosity of the cement. The moulds should not be filled so as to leave to the cement the space necessary for its swelling, and the thickness of the blocks should not exceed 15 cm. otherwise the bubbles would have unequal dimensions at the bases and at the surfaces of the blocks.

The temperature plays a predominating part in the rate of decomposition of the hydrogen peroxide, and it is necessary, therefore, to prepare the catalyst always at the same temperature, 15 to 20° C. for instance, or even less if large masses are treated which heat up during hardening or if the metal compounds used are powerful decomposition catalysts for the hydrogen peroxide.

The catalyst may be activated by reduction by hydrogen or a gas rich in hydrogen inside the very apparatus in which it is to be used. For catalysts having a nickel base, the reduction takes place between 250 and 600° C. but it has been found that the optimum temperature was between 400 and 500° C.

This temperature should be reached gradually and held for 2 to 4 hours. First water vapour is released, then the volatile products of decomposition of the metal salt. The cooling, also should be very gradual and should be carried out under a stream of hydrogen.

It is preferable to maintain a suitable ratio $$\frac{\text{Weight of the metal compound}}{\text{Weight of cement}}$$

generally somewhat less than 1, and a porosity corresponding to an apparent density of 0.8 to 1.1 before reduction. Thus a very appreciable mechanical strength is obtained, which increases, in general, after reduction.

The reduction is accompanied only by a slight shrinking (4 to 5%) as compared with that of similar catalysts in wafer form (16 to 20%). This is due to the cement armature which is not very deformable.

It was stated above that the depth imperviousness of these catalysts with a large effective area gave them a long life. Anyhow, when their activity has decreased to a large extent, it is very easy to regenerate them, for instance, by a process comprising the following stages:

(a) Extraction by means of a suitable solvent (methanol for example) of the absorbed organic products.

(b) Possibly an oxidizing roasting for eliminating the nonvolatile impurities, followed by a scavenging by means of an inert gas.

(c) A reactivation by hydrogen in the same conditions as the initial activation, i.e. preferably between 400 and 500° C.

Several successive regenerations may be effected with no substantial decrease in activity being found for these catalysts.

Comparative measurements have been effected between conventional catalysts (Raney nickel, nickel based wafered catalyst, palladium on carbon, palladium on activated alumina, etc.) and catalysts on aerated cement. All are in favour of the latter type of catalyst both as regards the duration of activity and from an economic point of view if the price of the catalyst used is referred to the unit of hydrogen peroxide produced.

Activity comparisons have also been effected between catalysts with variable porosities prepared in accordance with the same method, in which only the amounts of hydrogen peroxide involved during the mixing of the cement were different. In the range in which these catalysts offer an interest (specific gravity previous to reduction from 0.7 to 1.3) it may be assumed, as a first approximation, that for a given weight of catalyst the activity is in inverse proportion to the density of the catalyst used.

In limiting cases, where the cement is subjected to no treatment intended to make it porous, measurements showed that for a given weight of metal these catalysts with a specific gravity higher than 2 are from 6 to 10 times less active than the corresponding porous catalysts with a specific gravity of about 0.9. Their drop in activity in time and with the successive treatments, further, is much more marked.

The catalysts, according to the invention may be put in action either in the shape of grains or lumps constituting a fixed bed, or in the shape of a powder or fine grains in suspension in a liquid medium.

The grains or the powder are preferably graded by sieving.

Seven examples are given, hereinafter for the working of the invention, in which the metal of the catalyst is nickel, the alkylanthraquinone is the 2-ethylanthraquinone or the 2-tertiobutylanthraquinone and the solvent for the anthraquinone is diisobutylketone, heptyl acetate or a paralk-benzene mixture (by "paralk" is meant a mixture of straight chain aliphatic secondary alcohols, containing seven to eleven carbon atoms per molecule, and boiling between 190 and 240° C. approximately). It will be noted that the best results are obtained with the diisobutylketone, the use of which in the production of hydrogen peroxide has been described in the Belgian patent application No. 421,866, of March 29, 1955, in the name of the present applicants.

*Example 1.*—A catalyst is prepared according to the following method: 60 g. of nickel oxide NiO are mixed intimately with 100 g. of refractory, very pure aluminous cement. After sifting grinding and a new mixing the resulting powder is mixed with 73 cm.$^3$ of distilled water, 3 cm.$^3$ of a 5% soap solution and 1.15 cm.$^3$ of 30% hydrogen peroxide.

The cement is poured into a mould where it swells slowly owing to the decomposition of the hydrogen peroxide, until it reaches a volume of 220 cm.$^3$. After a complete hardening under water and drying, this catalyst which has a good mechanical strength is crushed into grains of 0.3 to 0.5 cm.$^3$.

100 cm.$^3$ of these grains, i.e. 43.1 g. of catalyst, containing 9.85 g. of nickel are reduced at 460° C. in a stream of pure hydrogen. A shrinking of 6% is noted.

After cooling, this catalyst is impregnated with a 9% solution of ethyl-2-anthraquinone in heptyl acetate. Under these conditions it can absorb 7 cm.$^3$ of hydrogen per minute owing to the formation of ethyl-2-anthraquinhydrone which can be oxidized later into ethyl-2-anthraquinone and hydrogen peroxide. It will be noted that 100 cm.$^3$ of a similar catalyst in grains, not having undergone the treatment for making it porous and containing 16.2 g. of nickel, treated in quite a similar manner, allow the absorption of 1.3 cm.$^3$ only, per minute, with the same solution.

*Example 2.*—A catalyst is prepared according to the same method as in Example 1, by mixing 425 g. of the same cement with 276 g. of commercial nickel carbonate; the mixing is effected with 370 cm.$^3$ of water and 10 cm.$^3$ of a 5% soap solution; 5 cm.$^3$ of 30% hydrogen peroxide are mixed with the paste just before moulding.

After releasing of the oxygen, a block of 1 cm.$^3$ is obtained which is subjected to various treatments after complete hardening and drying.

(a) After reduction by hydrogen at 460° C., 100 cm.$^3$ of this catalyst crushed into grains of 0.3 to 0.5 cm.$^3$ containing a total of 6.3 g. of nickel, are impregnated with a 9% solution of 2-ethyl-anthraquinone in heptyl acetate. The absorption of hydrogen by this catalyst thus impregnated is 18 cm.$^3$/minute at 20° C.

(b) After numerous, repeated simular treatments, and an artificial poisoning by the passing of pure oxygen, this catalyst is washed with methanol, and subjected to a reducing roasting at 460° C. in a stream of hydrogen. It almost recovers its initial activity and, impregnated with the same solution as in paragraph (a) above, it allows the absorption of 16 cm.$^3$ of hydrogen per minute.

(c) 5 g. of the same catalyst are powdered and the grains are graded between 0.1 and 0.15 by sifting. After reduction at 460° C. in a stream of hydrogen, this powder containing 0.7 g. of nickel is stirred in 50 cm.$^3$ of a 12% solution of 2-tertiobutyl anthraquinone into heptyl acetate in the presence of hydrogen. The absorption of this gas is 12 cm.$^3$ per minute.

(d) 20 g. of this catalyst are powdered and graded to the above dimensions by sifting. This powder containing 2.5 g. of nickel is reduced at 460° C. in a stream of hydrogen and placed in suspension in 100 cm.$^3$ of a 10% solution of 2-ethyl-anthraquinone in a paralk-benzene mixture. Under these conditions, 400 cm.$^3$ of hydrogen may be absorbed in five minutes at 20° C.

(e) 50 g. of the same catalyst, in powder form, containing 7 g. of nickel, are placed in action in a continuous apparatus where a solution similar to the above circulates at a constant rate. The experiment is stopped when the activity of the catalyst has fallen to half its initial value. It has then operated for about 150 hours, with a production of 880 g. of hydrogen peroxide, expressed as a 100% product. The quinone losses and the formation of by-products are negligible.

(f) This catalyst, washed with methanol, roasted at 450° C. in the open air then reduced at 460° C. in hydrogen, can still operate for 112 hours under identical conditions and allow the formation of 640 g. of 100% hydrogen peroxide.

Several successive regenerations are possible.

(g) 50 g. of the powdered catalyst similar to the above are used continuously in a manner similar to the test described under (e) in a 6% solution of ethyl-anthraquinone in diisobutylketone. The activity of the catalyst decreases by half its initial value after 200 hours of operation and allow the production of 1500 g. of 100% hydrogen peroxide. The quinone losses and the formation of by-products are negligible.

(h) This same catalyst, washed with methanol and reacted directly with hydrogen without any previous oxidation, still allows the production of 1420 g. of 100% hydrogen peroxide in 190 hours of operation under similar conditions. Several successive regenerations are thus possible.

(i) 110 g. of the same catalyst, in grains, of 0.3 to 0.5 cm.$^3$ are placed in a fixed tower where the same solution as in the previous example is circulated. It can then operate for 2700 hours before its activity drops to half its initial value. During that time it allowed the production of 20 kgs. of a 15% solution of hydrogen peroxide, i.e. about 3 kgs. of 100% hydrogen peroxide $H_2O_2$. Several regenerations similar to those of the above examples are possible.

*Example 3.*—A catalyst is prepared according to the same method, but with a strictly pure nickel carbonate. 100 cm.³ of this catalyst crushed into grains of 0.3 to 0.5 cm.³ and used in the same conditions as in the Example 2(a) with a 9% solution of 2-ethylanthraquinone in heptyl acetate allow the absorption of 20 cm.³ of hydrogen per minute at 20° C. After poisoning and regeneration (compare with Example 2(b)) its activity comes back, substantially, to its initial value.

The purpose of this example is to show that the use of purified products makes it possible to increase the initial activity of catalyst of this type.

*Example 4.*—A catalyst is prepared as indicated in the above examples by addition of 49.6 g. of nickel hydroxide to 100 g. of pure aluminous cement. The mixing is effected by adding 60 cm.³ of water, 3 cm.³ of a 5% soap solution and 1.1 cm.³ of 30% hydrogen peroxide before moulding. After hardening and drying, a block with bubbles of 223 cm.³ is obtained. This block is crushed into grains of 0.3 to 0.5 cm.³, 100 cm.³ of which containing 6.5 g. of nickel are reduced at 460° C. in a stream of hydrogen. An 8% shrinking is noted. This catalyst is impregnated with a 9% solution of 2-ethyl-anthraquinone in heptyl acetate and allows the absorption, at 20° C. of 17 cm.³ of hydrogen per minute.

After exhaustion and an artificial poisoning similar to those given in Example 2, a regeneration by washing with methanol and roasting at 460° C. in a stream of hydrogen allows this catalyst, impregnated with the same solution as above, to absorb 16 cm.³ of hydrogen per minute. Several successive regenerations are also possible.

*Example 5.*—A catalyst is prepared according to the same manner by mixing 60 g. of nickel oxalate with 100 g. of aluminous cement. The mixing is carried out with 60 cm.³ of water, 3 cm.³ of a 3% soap solution, and 1.14 cm.³ of 30% hydrogen peroxide. An aerated block of 190 cm.³ is thus obtained.

100 cm.³ of grains, similar to those of the previous example and containing 5.21 g. of nickel are reduced under a stream of hydrogen at 460° C. The shrinking is of 4%.

This catalyst, impregnated with a 9% solution of 2-ethyl-anthraquinone in heptyl acetate allows an absorption of 10 cm.³ of hydrogen per minute at 20° C.

*Example 6.*—8500 g. of quick setting refractory cement, with a high alumina content, having, for instance, a composition approaching the formula $2Al_2O_3$, $3CaO$, and going through a 23 Afnor screen (meshes 0.160 mm. wide) are mixed, dry, with 5540 g. of purified nickel carbonate with about 46% nickel. Then gradually and while stirring, 5.5 liters of water are added, holding 4 g. of soap in solution and 120 cm.³ of 35% hydrogen peroxide in weight. After a few minutes of stirring the paste obtained is poured into a rectangular mould and allowed to stand in a cool place. At the end of 24 hours, the block obtained is removed from the mould and immersed in cold water for 48 hours, then dried in air for several days.

The block is then crushed into grains of 3 to 8 mm. and the nickel carbonate is reduced to a metal condition by a stream of a gas rich in hydrogen, at a temperature of about 400–500° C. either in a suitable oven, from which, after cooling, it may be introduced directly into the apparatus for the production of hydrogen peroxide or, possibly, in this apparatus itself.

This catalyst in the form of grains is placed in operation in an apparatus comprising the following main portions:

(1) A reduction column in which the 2-ethyl-anthraquinone is reduced at the vicinity of the ambient temperature by a stream of hydrogen gas.

(2) An oxidation column in which the 2-ethyl-anthrahydroquinone formed is oxidized by an air stream, reforming the 2-ethyl-anthraquinone with a simultaneous formation of hydrogen peroxide.

(3) A column in which the hydrogen peroxide formed is extracted by a counter-current washing with a stream of distilled water and from which the organic solution returns to the reduction column.

The reduction column is provided with 110 g. of catalyst (weight before reduction) comprising approximately 17 g. of nickel and there is circulated, therein, at a rate of 400 cm.³ per hour, 1200 cm.³ of a liquid formed of diisobutylketone holding in solution 72 g. of 2-ethyl-anthraquinone. Under these conditions, the apparatus was kept operating without any interruption for 2640 hours. At the beginning of this period the organic solution subjected to the washing contains, per liter, 4.92 g. of hydrogen peroxide. At the 2640th hour, this content has dropped to 2.55 g. The aqueous solution of hydrogen peroxide obtained by washing the organic solution contains, per liter, 242 g. of hydrogen peroxide at the beginning of the operation and 125 g. at the end. The effective production of 100% hydrogen peroxide has been 3530 g.

After 2640 hours of operation, the amount of ethyl-2-anthraquinone present in the solution has decreased by 11.2 g. i.e. a consumption of 3.2 g. per kilogram of 100% hydrogen peroxide produced.

The product in solution then has the following composition:

| | Percent |
|---|---|
| Ethyl-2-anthraquinone | 72 |
| Ethyl-2-tetrahydro-anthraquinone | 16 |
| Non reductible products | 12 |

When analyzed, the solvent shows no modification of its initial composition. In particular, there are no peroxides nor reduction products of the diisobutylketone. The consumption of diisobutylketone amounts to 10 g. per kilogram of 100% hydrogen peroxide obtained, taking into account a recuperation of the solvent contained in the evacuated hydrogen and air drains, by condensation.

*Example 7.*—The catalyst is prepared as in the above example, but it is pulverized into particles the dimensions of which are between 0.10 and 0.15 mm. This powdered catalyst is placed in operation in an apparatus similar to that of the previous example but instead of being arranged in fixed beds in the reduction column, it is placed in suspension in the liquid. This liquid is constituted of 1250 cm.³ of diisobutylketone, holding, in solution 70 g. of 2-ethylanthraquinone and circulates at a rate of 400 cm.³ an hour. The amount of catalyst placed in operation is of 15 g. (weight previous to reduction).

At the beginning of the operation, the oxidized organic solution subjected to the washing contains 0.475 g. of hydrogen peroxide for 100 cm.³. After 555 hours of operation, this content has dropped to 0.260 g. for 100 cm.³. The total effective production of hydrogen peroxide has been 762 g. during that period of operation during which no renewal of the catalyst was effected. The product in solution, at the end of that period contains 80% of ethyl-2-anthraquinone and 20% of non reductible products. There has been no formation of ethyl-2-tetrahydroanthraquinone.

What I claim is:

1. A process for the production of hydrogen peroxide by alternate reactions of reduction and oxidation by an oxygen-containing gas of an alkylanthraquinone dissolved in a liquid, comprising effecting said reduction under the action of a gas rich in hydrogen, in the presence of a reduced metal catalyst distributed inside an inert support, said catalyst and support being prepared by mixing and crushing a nickel salt reductible by hydrogen with a refractory cement containing silica, alumina, and lime, by mixing the resulting powder with a mixture of water, hydrogen peroxide and soap, by crushing the solid obtained after hardening, then reducing the nickel salt in a stream of hydrogen at a temperature between 400° C. and 500° C.

2. A process for the production of hydrogen peroxide by alternate reactions of reduction and oxidation by an oxygen-containing gas of an alkylanthraquinone dissolved in a liquid, comprising effecting said reduction with a gas rich in hydrogen, in the presence of a reduced metal catalyst distributed inside an inert support, said catalyst and support being prepared by mixing and crushing a nickel compound reductible by hydrogen with a refractory cement containing silica, alumina and lime, by mixing the resulting powder with a mixture of water, hydrogen peroxide and a tensio-active compound, by crushing the solid obtained after hardening, then reducing the nickel compound in a stream of a gas rich in hydrogen.

3. A process according to claim 2, wherein the tensio-active compound used is free from sulphur in its molecule.

4. A process according to claim 2, wherein the reduction of the nickel compound is carried out at a temperature between 250° and 600°.

5. A process according to claim 2, wherein the apparent specific gravity of the hardened solid before the reduction of the nickel compound is set at a value between 0.7 and 1.3.

6. A process according to claim 5, wherein the weight of said nickel compound is less than the weight of the refractory cement with which it is mixed, and the apparent specific gravity of the solid before the reduction of the nickel compound is set at a value between 0.8 and 1.1.

7. A process for the production of hydrogen peroxide by alternate reactions of reduction and oxidation by an oxygen-containing gas of an alkyl-anthraquinone dissolved in a liquid, comprising effecting said reduction with a gas rich in hydrogen, in the presence of a reduced metal catalyst distributed inside an inert support, said catalyst and support being prepared by mixing and crushing a nickel compound reductible by hydrogen with a refractory cement containing silica, alumina and lime, by mixing the resulting powder with a mixture of water and a tensio-active compound free from sulphur in its molecule, by providing and keeping gas bubbles within the paste formed until it is hardened, by crushing the solid obtained after hardening, then reducing the nickel compound in a stream of a gas rich in hydrogen.

8. A process according to claim 7, wherein the gas bubbles are provided by adding to the mixture of water and a tensio-active compound a substance capable of being decomposed in the cold while evolving a gas in the presence of the nickel compound.

9. A process for the production of hydrogen peroxide by alternate reactions of reduction and oxidation by an oxygen-containing gas of an alkylanthraquinone dissolved in a liquid, comprising effecting said reduction with a gas rich in hydrogen in the presence of a reduced metal catalyst distributed inside an inert support, said catalyst and support being prepared by mixing and crushing a compound of said metal reductible by hydrogen with a refractory cement containing silica, alumina and lime, by mixing the resulting powder with a mixture of water and a tensio-active compound free from sulphur in its molecule, by providing and keeping gas bubbles within the paste formed until it is hardened, by crushing the solid obtained after hardening, then reducing the nickel compound in a stream of a gas rich in hydrogen.

References Cited in the file of this patent

UNITED STATES PATENTS

| | | |
|---|---|---|
| 1,915,473 | Raney | June 27, 1933 |
| 2,038,556 | Huettner et al. | Apr. 28, 1936 |
| 2,371,928 | Schneider | Mar. 20, 1945 |
| 2,739,042 | Corey et al. | Mar. 20, 1956 |

FOREIGN PATENTS

| | | |
|---|---|---|
| 1,092,393 | France | Dec. 10, 1954 |
| 10,412 | Great Britain | Jan. 23, 1902 of 1901 |
| 669,274 | Great Britain | Apr. 2, 1952 |
| 686,574 | Great Britain | Jan. 28, 1953 |
| 731,212 | Great Britain | June 1, 1955 |

OTHER REFERENCES

S. Berkman et al.: "Catalysis—Ingorganic and Organic," Reinhold Publishing Corp., N.Y., page 473.